United States Patent
Van Phan et al.

(10) Patent No.: US 12,501,509 B2
(45) Date of Patent: Dec. 16, 2025

(54) METHOD AND SYSTEM FOR EFFICIENTLY ACTIVATING OR DEACTIVATING USER EQUIPMENT

(71) Applicant: Nokia Technologies Oy, Espoo (FI)

(72) Inventors: Vinh Van Phan, Oulu (FI); Ling Yu, Espoo (FI); Devaki Chandramouli, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 400 days.

(21) Appl. No.: 18/002,428

(22) PCT Filed: Jun. 29, 2020

(86) PCT No.: PCT/IB2020/056136
§ 371 (c)(1),
(2) Date: Dec. 19, 2022

(87) PCT Pub. No.: WO2022/003393
PCT Pub. Date: Jan. 6, 2022

(65) Prior Publication Data
US 2023/0232488 A1     Jul. 20, 2023

(51) Int. Cl.
*H04W 76/27* (2018.01)
*H04W 76/34* (2018.01)
*H04W 76/40* (2018.01)

(52) U.S. Cl.
CPC ........... *H04W 76/27* (2018.02); *H04W 76/34* (2018.02); *H04W 76/40* (2018.02)

(58) Field of Classification Search
CPC ..... H04W 76/27; H04W 76/34; H04W 76/40; H04W 76/30; H04W 76/10
See application file for complete search history.

(56) References Cited

U.S. PATENT DOCUMENTS

2013/0044590 A1*  2/2013  Lee ................. H04W 76/38
                                                 370/328
2016/0029359 A1*  1/2016  Agiwal ............ H04W 72/04
                                                 370/329

(Continued)

OTHER PUBLICATIONS

"3rd Generation Partnership Project; Technical Specification Group Services and System Aspects; Feasibility Study on LAN Support in 5G (Release 16)", 3GPP TR 22.821, V16.1.0, Jun. 2018, pp. 1-52.

(Continued)

*Primary Examiner* — Jeong S Park
(74) *Attorney, Agent, or Firm* — Lippes Mathias LLP

(57) ABSTRACT

A method, apparatus and computer program product are provided for efficiently activating or deactivating user equipment. An example method includes receiving a deactivation request comprising one or more identifiers for one or more user equipment or one or more user equipment groups, determining which one or more user equipment or user equipment groups are impacted by the deactivation request and causing a suspend request to be transmitted to the one or more user equipment or user equipment groups that are impacted. Another example method is provided for receiving an activation request comprising one or more identifiers for one or more user equipment or one or more user equipment groups, determining which one or more user equipment or user equipment groups are impacted by the activation request, and causing a notice to be transmitted to the one or more user equipment or user equipment groups that are impacted.

11 Claims, 7 Drawing Sheets

(56) References Cited

U.S. PATENT DOCUMENTS

| | | | |
|---|---|---|---|
| 2017/0202050 A1* | 7/2017 | Deng | H04W 76/18 |
| 2018/0199398 A1* | 7/2018 | Dao | H04W 76/27 |
| 2018/0302914 A1* | 10/2018 | da Silva | H04W 76/27 |
| 2019/0104474 A1* | 4/2019 | Raghunathan | H04W 76/27 |
| 2019/0387570 A1* | 12/2019 | Byun | H04W 76/11 |
| 2020/0137820 A1* | 4/2020 | Kim | H04W 4/70 |
| 2022/0132522 A1* | 4/2022 | Wei | H04W 72/23 |
| 2022/0150950 A1* | 5/2022 | Islam | H04L 1/1812 |

OTHER PUBLICATIONS

"3rd Generation Partnership Project; Technical Specification Group Services and System Aspects; Service requirements for the 5G system; Stage 1 (Release 17)", 3GPP TS 22.261, V17.1.0, Dec. 2019, 83 pages.

"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.

"3rd Generation Partnership Project; Technical Specification Group Services and System Aspects; Policy and charging control framework for the 5G System (5GS); Stage 2 (Release 16)", 3GPP TS 23.503, V16.3.0, Dec. 2019, pp. 1-112.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

International Search Report and Written Opinion received for corresponding Patent Cooperation Treaty Application No. PCT/IB2020/056136, dated Feb. 24, 2021, 11 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401, V15.11.0, Jul. 2020, pp. 1-418.

"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.

* cited by examiner

METHOD AND SYSTEM FOR EFFICIENTLY ACTIVATING OR DEACTIVATING USER EQUIPMENT

RELATED APPLICATION

This application was originally filed as PCT Application No. PCT/IB2020/056136, filed on Jun. 29, 2020, which is incorporated herein by reference in its entirety.

TECHNICAL FIELD

An example embodiment relates generally to wireless network access and communications technology, such as in the context of efficient support of Industrial Internet of Things (IIoT) systems and handling connections among user equipment (UE).

BACKGROUND

It is desirable to operations and management (O&M) of individual IIoT systems in an industrial automation environment to have fast, reliable and flexible activation and deactivation as well as efficient power saving, not only for individual UE members of the IIOT system but also for the whole system. Thus, the manner in which a fifth generation wireless (5G) network enables and facilitates the provision of radio-access connections for a large number of UEs of an individual IIoT system simultaneously on-demand is important. As the number of UEs that are members of individual IIoT systems increases, the demands on the IIoT system to support a wide variety of data traffic types and services in order to provide reliable network connectivity is also increasing which, in turn creates corresponding challenges.

BRIEF SUMMARY

A method, apparatus and computer program product are provided for efficient activation and deactivation of individual UE as well as a group of UEs belonging to an IIoT system. In this regard, an embodiment of the present disclosure proposes an approach that conserves energy and designed to support large numbers of IIoT devices in a real deployment.

In one example embodiment, a method is provided that includes receiving a deactivation request comprising one or more identifiers for one or more user equipment or one or more user equipment groups, determining which one or more user equipment or user equipment groups are impacted by the deactivation request and causing a suspend request to be transmitted to the one or more user equipment or user equipment groups that are impacted. The one or more identifiers comprises a generic public subscription identifier (GPSI) of a user equipment or a user group identification (ID). In some implementations, the deactivation request further comprises one or more configuration updates, wherein the one or more configuration updates comprises an expected reactivation time or a maximum required time interval before reactivation of the one or more user equipment or user equipment groups that are impacted. In another example implementation, the method includes waiting for the one or more user equipment or user equipment groups that are impacted to become inactive prior to causing a radio resource control (RRC) connection release triggering updating an operational state of the one or more user equipment or user equipment groups that are impacted to an RRC inactive state or an RRC idle state. The RRC connection release is a connection release for one or more IIoT device.

In another example embodiment, an apparatus is provided that includes means for receiving a deactivation request comprising one or more identifiers for one or more user equipment or one or more user equipment groups, means for determining which one or more user equipment or user equipment groups are impacted by the deactivation request and means for causing a suspend request to be transmitted to the one or more user equipment or user equipment groups that are impacted. In another example implementation, the apparatus includes means for waiting for the one or more user equipment or user equipment groups that are impacted to become inactive prior to causing RRC connection release triggering updating an operational state of the one or more user equipment or user equipment groups that are impacted to an RRC inactive state or an RRC idle state.

In another example embodiment, an apparatus is provided that includes at least one processor and at least one memory including computer program code for one or more programs with the at least one memory and the computer program code configured to, with the at least one processor, cause the apparatus at least to receive a deactivation request comprising one or more identifiers for one or more user equipment or one or more user equipment groups, determine which one or more user equipment or user equipment groups are impacted by the deactivation request and cause a suspend request to be transmitted to the one or more user equipment or user equipment groups that are impacted. In another example implementation, the computer program code is further configured to, with the at least one processor, cause the apparatus to wait for the one or more user equipment or user equipment groups that are impacted to become inactive prior to causing a RRC connection release triggering updating an operational state of the one or more user equipment or user equipment groups that are impacted to an RRC inactive state or an RRC idle state.

In another example embodiment, a computer program product is provided that includes at least one non-transitory computer-readable storage medium having computer executable program code instructions stored therein with the computer executable program code instructions comprising program code instructions configured, upon execution, to receive a deactivation request comprising one or more identifiers for one or more user equipment or one or more user equipment groups, determine which one or more user equipment or user equipment groups are impacted by the deactivation request and cause a suspend request to be transmitted to the one or more user equipment or user equipment groups that are impacted. In another example implementation, computer executable program code instructions comprising program code instructions is further configured, upon execution, to wait for the one or more user equipment or user equipment groups that are impacted to become inactive prior to causing a RRC connection release triggering updating an operational state of the one or more user equipment or user equipment groups that are impacted to an RRC inactive state or an RRC idle state.

In yet another example embodiment, a method is provided that includes receiving an activation request comprising one or more identifiers for one or more user equipment or one or more user equipment groups, determining which one or more user equipment or user equipment groups are impacted by the activation request, and causing a notice to be transmitted to the one or more user equipment or user equipment groups that are impacted. The notice comprises an indication whether a configuration and radio resources associated with the one or more user equipment or user equipment groups that are impacted are valid. In another example embodiment, the method further includes receiving a RRC connection resume complete message from the one or more user equipment or user equipment groups that are impacted in an instance in which the notice comprises an indication that the configuration and radio resources associated with the one or more user equipment or user equipment groups that are impacted are valid. In yet another example embodiment, the method includes causing a configuration update procedure in an instance in which the notice comprises an indication that the configuration and radio resources associated with the one or more user equipment or user equipment groups that are impacted are not valid. The RRC connection resume complete message indicates successful RRC connection for one or more IIoT device.

In another example embodiment, an apparatus is provided that includes means for receiving an activation request comprising one or more identifiers for one or more user equipment or one or more user equipment groups, means for determining which one or more user equipment or user equipment groups are impacted by the activation request, and means for causing a notice to be transmitted to the one or more user equipment or user equipment groups that are impacted. In another example implementation, the apparatus includes means for receiving a RRC connection resume complete message from the one or more user equipment or user equipment groups that are impacted in an instance in which the notice comprises an indication that the configuration and radio resources associated with the one or more user equipment or user equipment groups that are impacted are valid. In yet another example embodiment, the apparatus includes means for causing a configuration update procedure in an instance in which the notice comprises an indication that the configuration and radio resources associated with the one or more user equipment or user equipment groups that are impacted are not valid.

In another example embodiment, an apparatus is provided that includes at least one processor and at least one memory including computer program code for one or more programs with the at least one memory and the computer program code configured to, with the at least one processor, cause the apparatus at least to receive an activation request comprising one or more identifiers for one or more user equipment or one or more user equipment groups, determine which one or more user equipment or user equipment groups are impacted by the activation request, and cause a notice to be transmitted to the one or more user equipment or user equipment groups that are impacted. In another example implementation, the computer program code is further configured to, with the at least one processor, cause the apparatus to receive a respective RRC connection resume complete message from the one or more user equipment or user equipment groups that are impacted in an instance in which the notice comprises an indication that the configuration and radio resources associated with the one or more user equipment or user equipment groups that are impacted are valid. In yet another example embodiment, the computer program code is further configured to, with the at least one processor, cause the apparatus to cause a configuration update procedure in an instance in which the notice comprises an indication that the configuration and radio resources associated with the one or more user equipment or user equipment groups that are impacted are not valid.

In another example embodiment, a computer program product is provided that includes at least one non-transitory computer-readable storage medium having computer executable program code instructions stored therein with the computer executable program code instructions comprising program code instructions configured, upon execution, to receive an activation request comprising one or more identifiers for one or more user equipment or one or more user equipment groups, determine which one or more user equipment or user equipment groups are impacted by the activation request, and cause a notice to be transmitted to the one or more user equipment or user equipment groups that are impacted. In another example implementation, computer executable program code instructions comprising program code instructions is further configured, upon execution, to receive a RRC connection resume complete message from the one or more user equipment or user equipment groups that are impacted in an instance in which the notice comprises an indication that the configuration and radio resources associated with the one or more user equipment or user equipment groups that are impacted are valid. In yet another example implementation, computer executable program code instructions comprising program code instructions is further configured, upon execution, to cause a configuration update procedure in an instance in which the notice comprises an indication that the configuration and radio resources associated with the one or more user equipment or user equipment groups that are impacted are not valid.

BRIEF DESCRIPTION OF THE DRAWINGS

Figure 1:
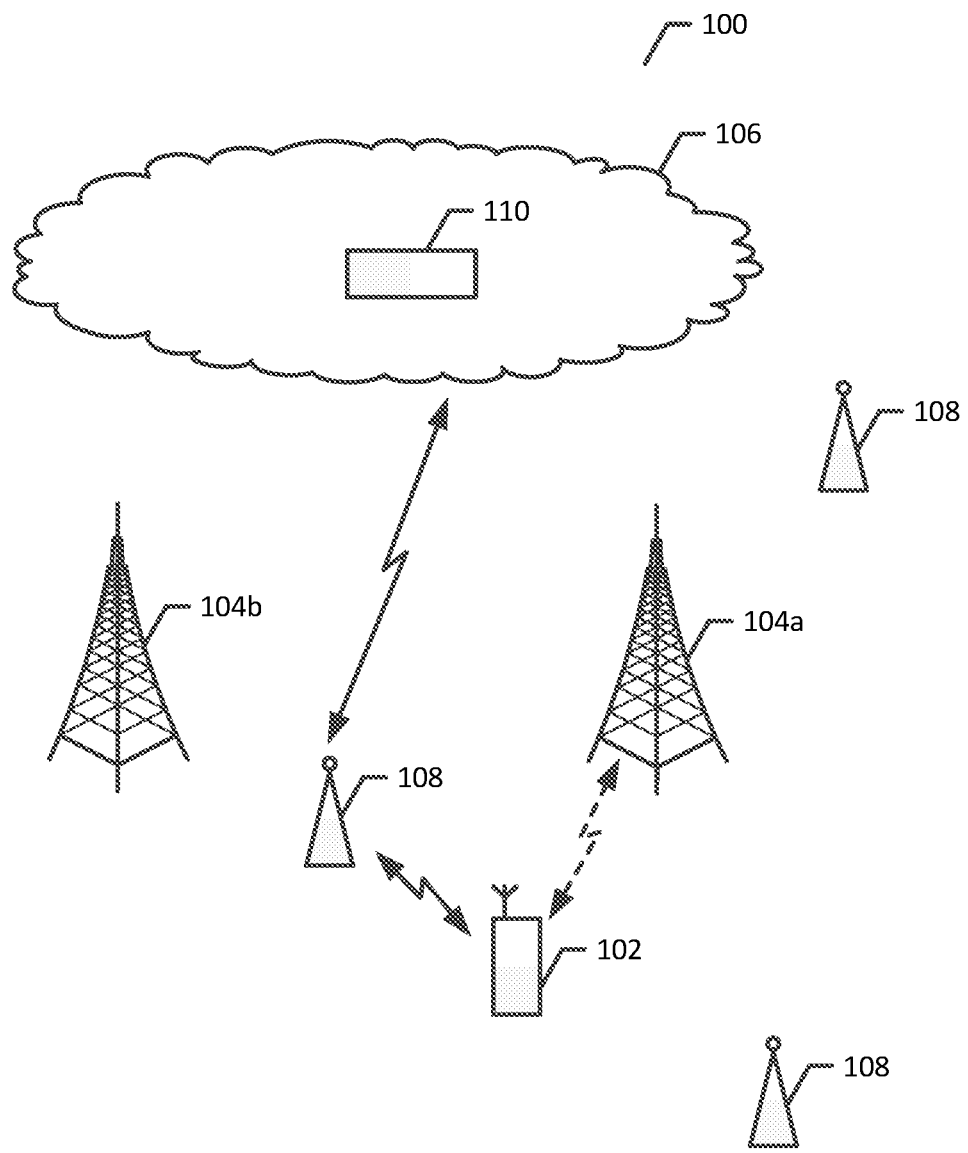
Figure 2:
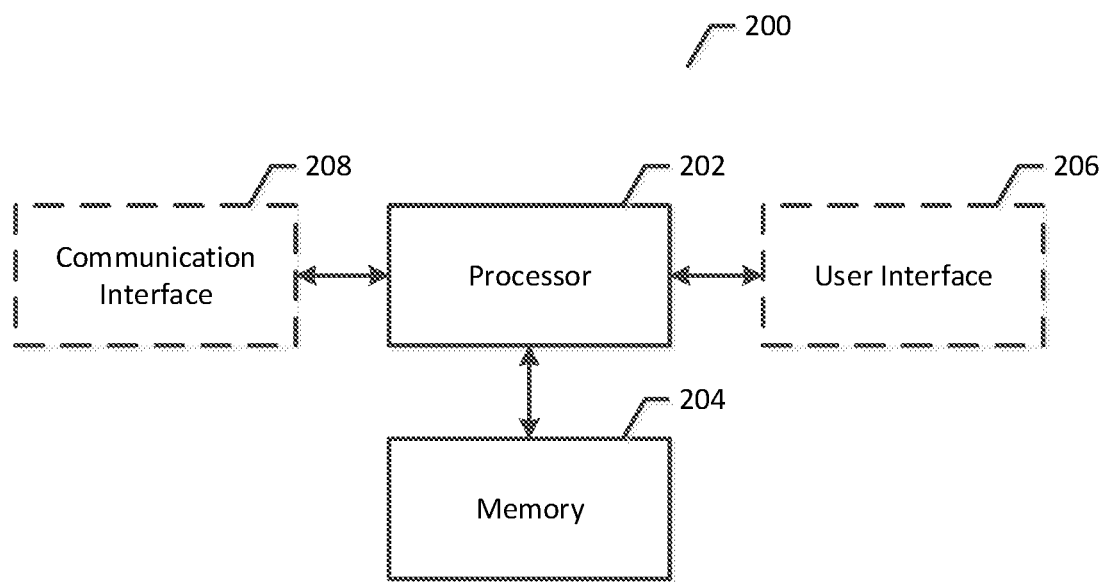
Figure 3:
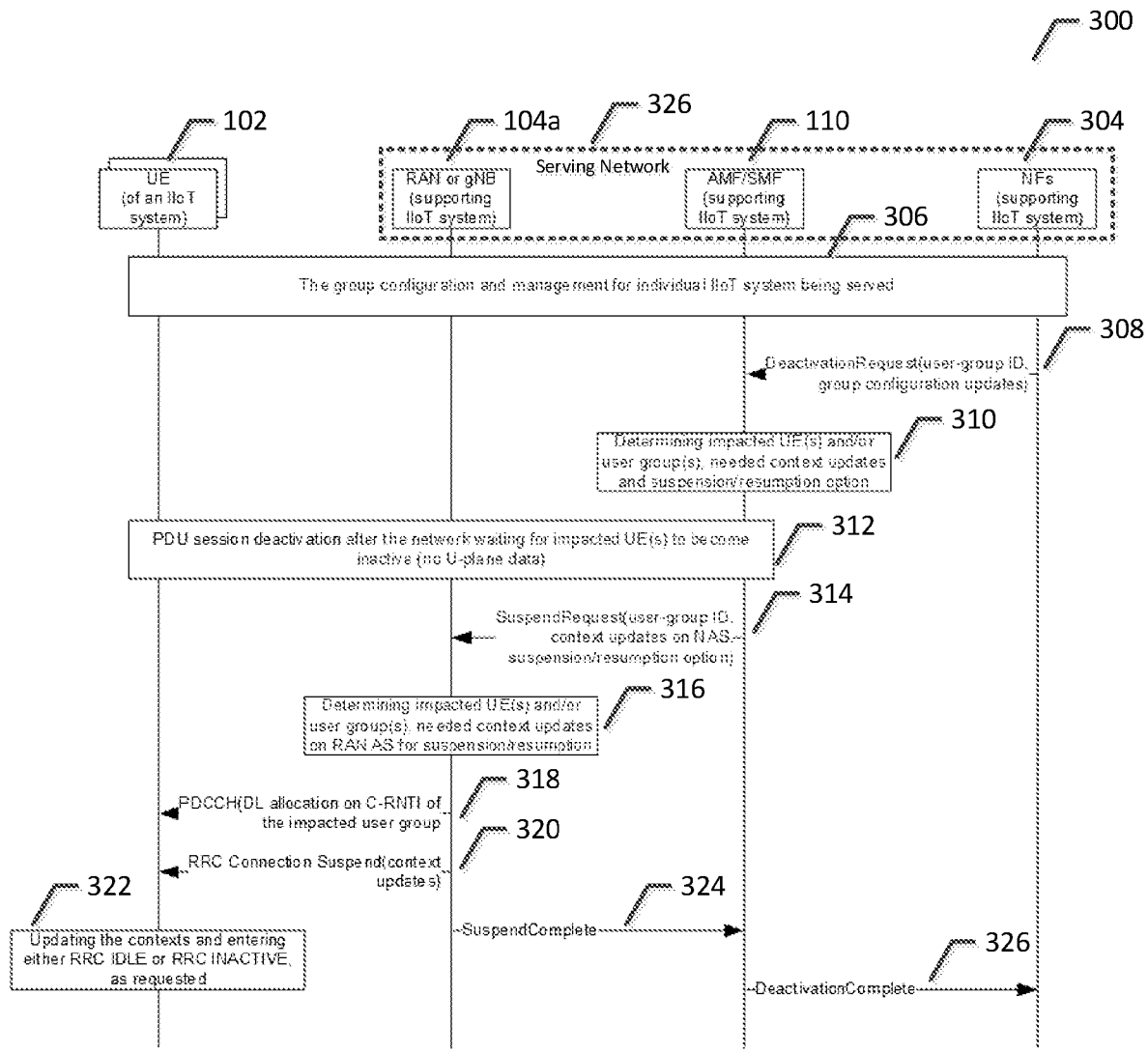
Figure 4:
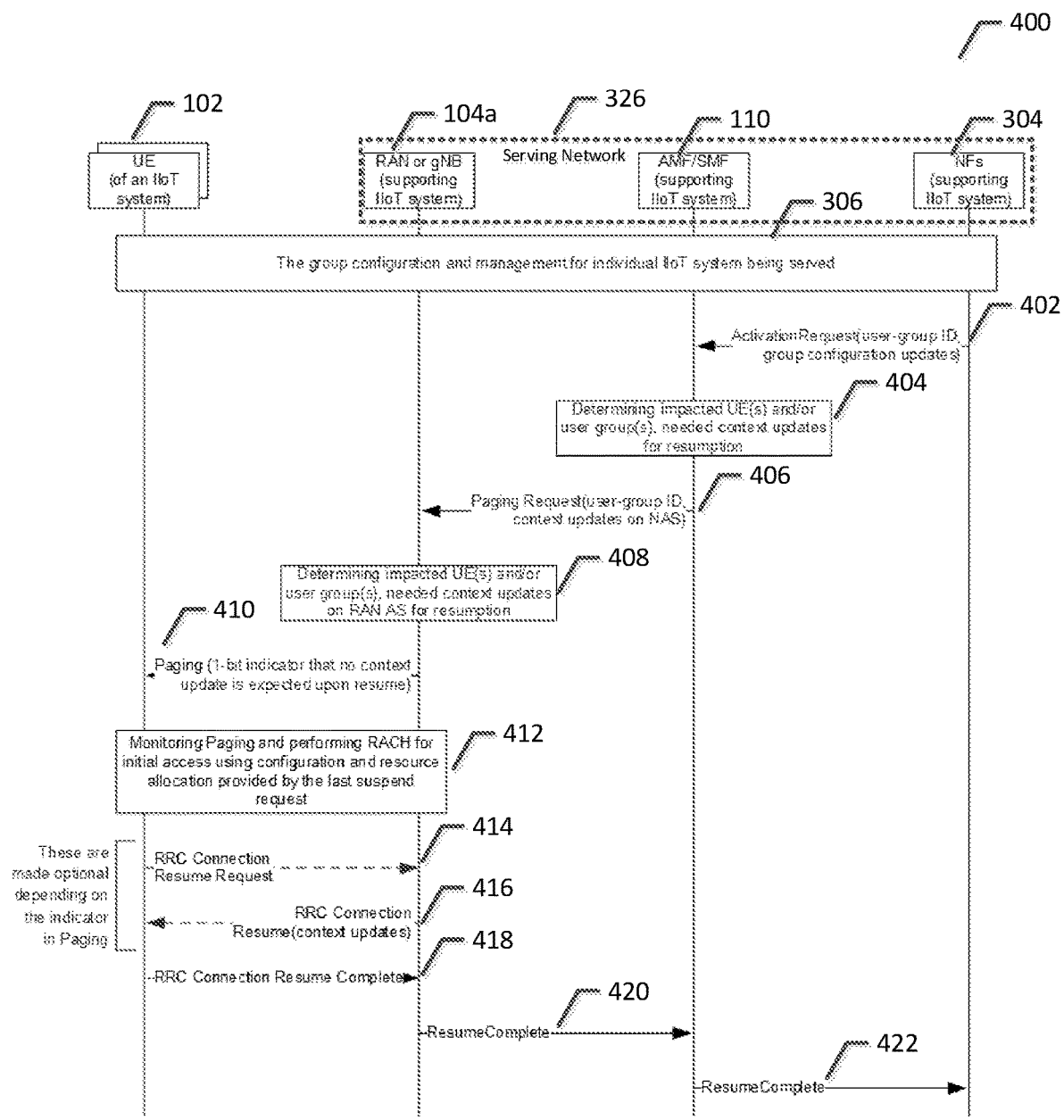
Figure 5:
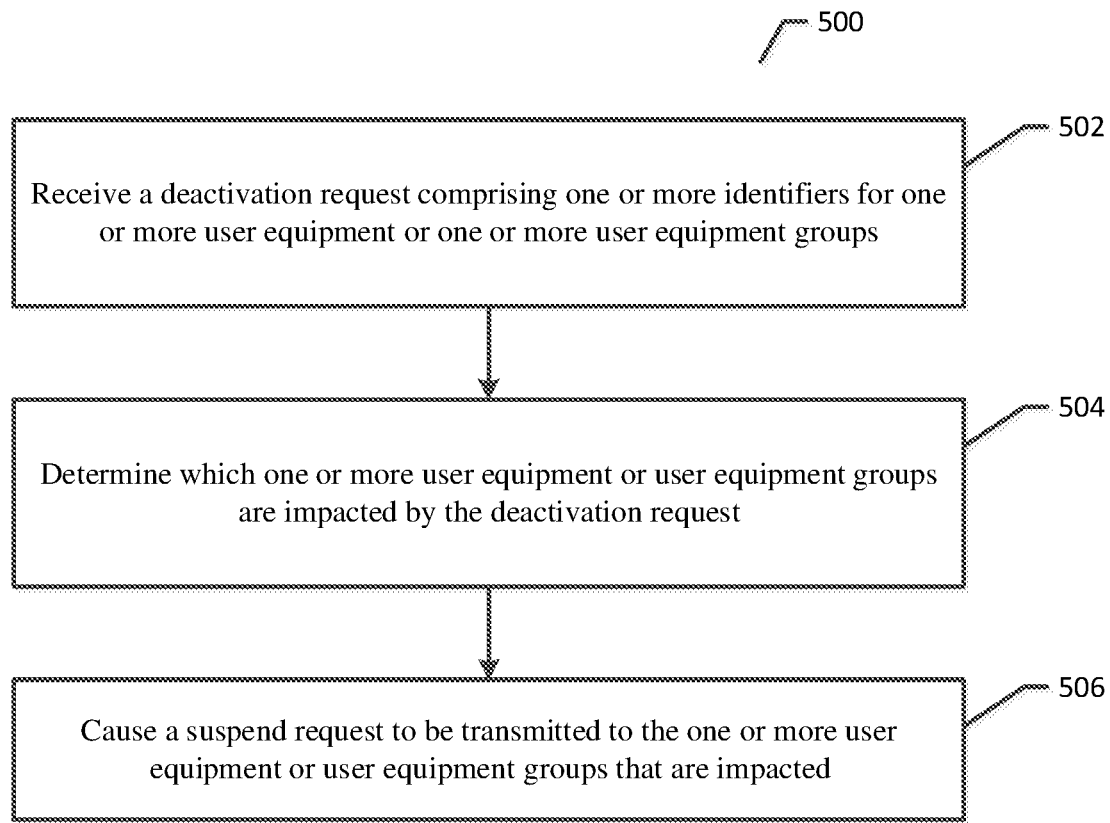
Figure 6:
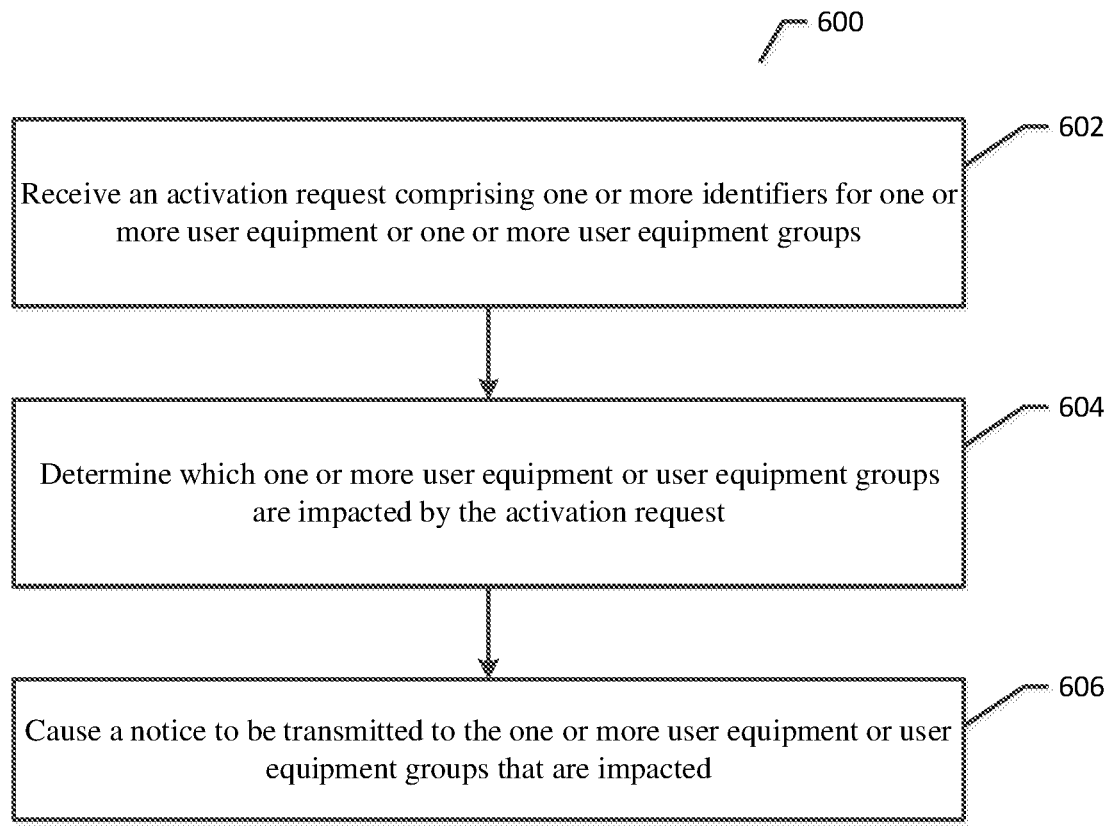
Figure 7A:
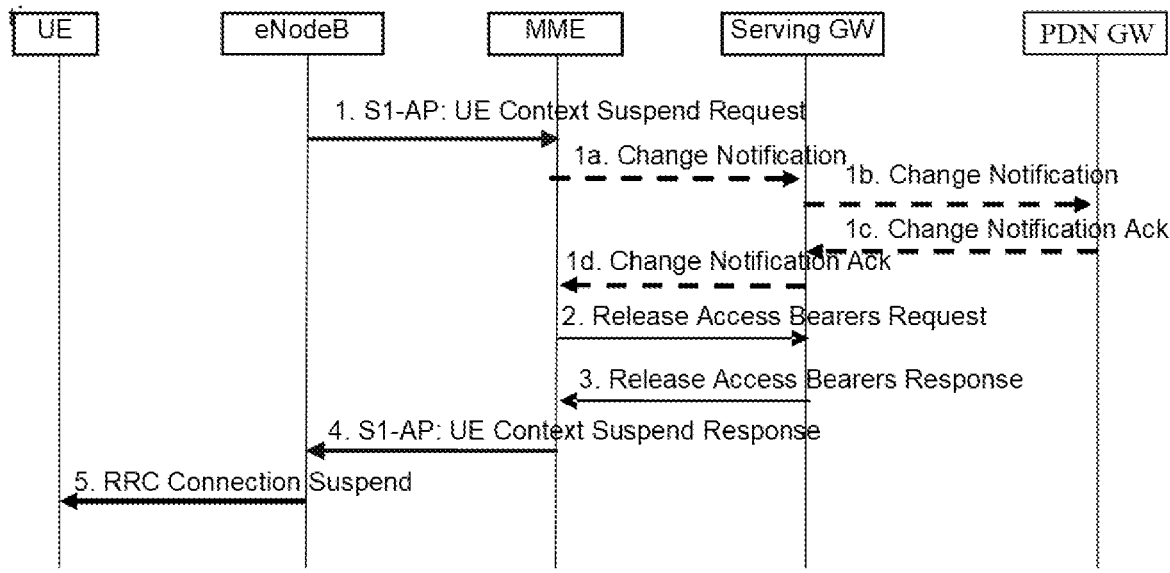
Figure 7B:
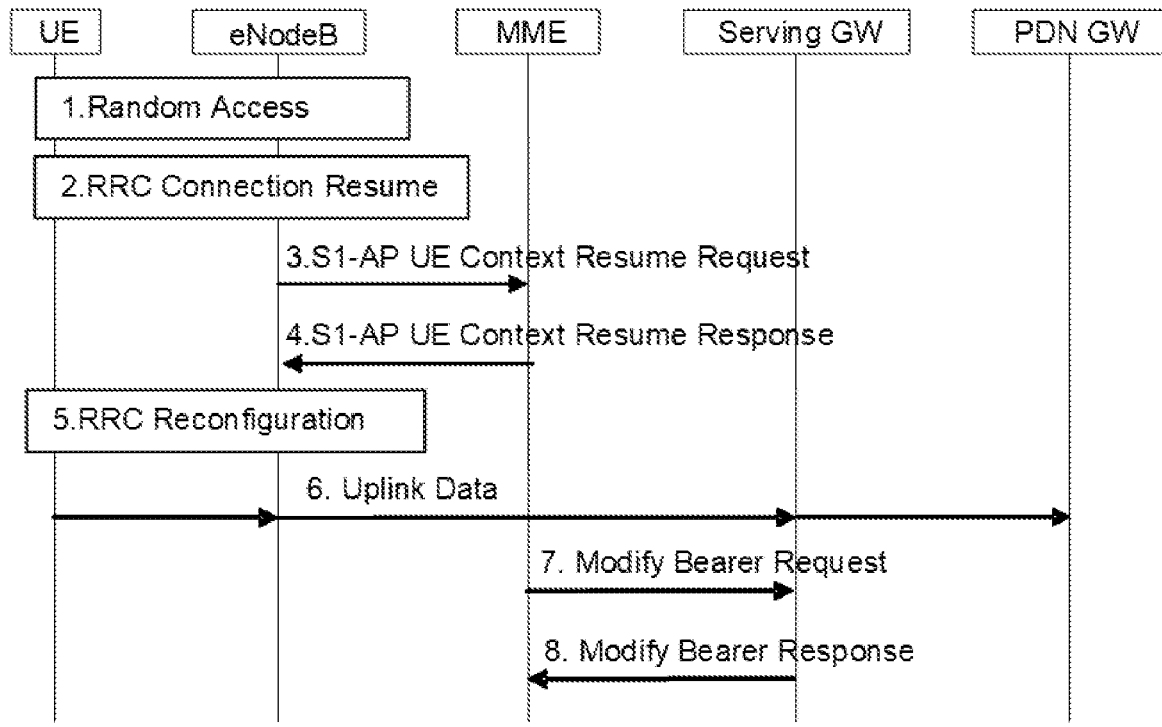

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention;

FIG. 3 is a sequence diagram illustrating a set of suspend operations performed, such as by the apparatus of FIG. 2, in accordance with an example embodiment of the present invention;

FIG. 4 is a sequence diagram illustrating a set of resume operations performed, such as by the apparatus of FIG. 2, in accordance with an example embodiment of the present invention;

FIG. 5 is a flowchart illustrating a set of suspend operations performed, such as by the apparatus of FIG. 2, in accordance with an example embodiment of the present invention;

FIG. 6 is a flowchart illustrating a set of resume operations performed, such as by the apparatus of FIG. 2, in accordance with an example embodiment of the present invention; and FIGS. 7A and 7B are sequence diagrams illustrating operations related to connection suspend and connection resume procedures documented in the standards document 3GPP TS 36.300.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Certain embodiments of the present disclosure may be supported by any of various wireless systems including, for example, an IEEE 802.xx system, 3GPP system, 3GPP LTE system and 3GPP2 system. Further details regarding the supporting wireless system are provided by the standards documents relating to the respective systems, such as the standards documents for 3GPP TS 36.300, which are incorporated by reference.

As development of 5G and other advanced networks has progressed, many participants in the networking industry and other relevant fields have recognized a number of characteristics and situations that may be provided for and encountered by such networks. For example, the structure and regular operation of an individual IIoT system in an industrial automation environment is known beforehand. For examples, individual UEs or UE groups of an individual IIoT system may correspond to different physical entities (e.g., individual rooms, sub-spaces or areas of factory or machine units), functional groups (e.g., monitoring sensors for operational environments of the factory; operating sensors and actuators for individual machine units; or supervising master devices and supervised slave devices for factory or machine operation), or operational tasks or processes (e.g., open-loop control, closed-loop control, content transmission, or sensing and measurement reporting). Thus, UEs of an individual IIoT system and their communication needs can be classified beforehand into different user groups, wherein each user group has some particular services and service requirements as well as coexisting associations preestablished with other user groups which individual UEs may belong to simultaneously, as specified for the operation of the individual IIoT system. The coexisting associations preestablished with user groups creates possible interdependence between classified user groups such that, if a UE is activated for a first user group then the UE is also activated for a second user group associated to the first user group but not necessarily other way around.

For operating an individual IIoT system over time, the controller of the individual IIoT system may need to be able to activate or deactivate operation of any individual UE as well as any user group of the IIoT system on an as-needed basis. There can be a temporary or short-term suspension or halting of the operation related to at least a part of the IIoT system due to some technical issues happening during the operation. In this case, there is a need to resume the impacted part of the IIoT system to a proper operation stage in line with the rest of the IIoT system as soon as possible. Alternatively, there can be a long-term suspension or deactivation of the operation related to at least a part of the IIoT system for regular on-off operations and maintenance (O&M). In this case, the impacted part of the IIoT system may be resumed from the start of the operation or restarted.

Some approaches to supporting UEs are disclosed in standards documents TS 23.501, 23.502 and 23.503, however, O&M aspects and optimizations for support of IIoT systems generally have not been considered. In particular, such standards documents have only specified support of Release 16 5G Local Area Network (LAN) with access and transport services for individual UEs of 5G Radio Access Network (RAN). Virtual Network (VN) group and group IDs (internal and external) are specified for a 5G LAN. However, O&M aspects and optimizations for support of IIoT systems have not generally been considered In such approaches, a 5G VN group consists of a set of UEs using private communication for 5G LAN-type services. According to the standards documents, a 5G VN group is characterized by the following: 5G VN group identities (e.g., External Group ID and Internal Group ID) used to identify the 5G VN group; 5G VN group membership, wherein the 5G VN group members are uniquely identified by a Generic Public Subscription Identifier (GPSI) and the group as described in clause 5.2.3.3.1 of standards document TS 23.502 [3] is applicable to 5G LAN-type services; and 5G VN group data which includes the following parameters: protocol data unit (PDU) session type, data network name (DNN), single-network slice selection assistance information (S-NSSAI) and application descriptor. This 5G VN group configuration is either provided by Operations Administration and Maintenance (OA&M) or by an Application Function (AF) to the Network Exposure Function (NEF). Further, these standards documents only specify a 1:1 mapping between DNN and 5G VN group is supported (e.g., a PDU session provides access to one and only one 5G VN group). In this case, the Policy Control Function (PCF) delivers 5G VN group configuration information (DNN, S-NSSAI, PDU session type) to the UE for each GPSI that belongs to a 5G LAN group.

In such contexts and as illustrated in FIGS. 7A and 7B, the eNodeB base station (eNB) initiated UE context suspend-resume procedures have been specified in Long Term Evolution (LTE) for an efficient support of massive Internet of Things (IoT) with small data. FIG. 7A shows the data connection of an IoT-type UE to be suspended, (e.g., the active UE context of the IoT UE is stored in the serving RAN and core network (CN) while the UE, having no more data to send, is put to radio resource control (RRC) IDLE). Then as shown in FIG. 7B, at the next state transition of the UE to RRC CONNECTED for transmission of new small data, the connection is resumed with the stored UE context without a need of a full new connection setup just for transmitting small data which significantly reduces the signaling overhead. However, such suspend and resume procedures for IoT with small data in LTE does not consider cases when there are pre-established user-group classifications and coexistence (e.g., associations or interdependences between user groups) of an individual IIoT system.

I. Example System Architecture

While the method, apparatus and computer program product of an example embodiment may be deployed in a variety of different systems, one example of a system that may benefit from the procedures discussed and contemplated herein in accordance with an example embodiment of the present invention is depicted in FIG. 1. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with certain embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems as well as a plurality of IoT devices (e.g., thermostats, proximity sensors, flowmeters, and/or the like). System environment 100, as depicted in FIG. 1, also includes one or more access points 104a and 104b, such as base stations, (such as node Bs, evolved Node Bs (eNB), Next Generation NodeB (gNB), or the like, for example). A cellular access point, such as a base station, may define and service one or more cells. The access points may, in turn, be in communication with a network 106, such as a core network via a gateway, such that the access points establish cellular radio access networks by which the user equipment 102 may communicate with the network. The system environment 100 of FIG. 1 may include a plurality of different cellular radio access networks including, for example, a 5G radio access network, an LTE radio access network, a UMTS (universal mobile telecommunications system) radio access network, etc. FIG. 1 also includes an access and mobility management function (AMF)/SMF in which the UE may access the core network through a 5G radio access network (RAN). In some example implementations, equipment and other infrastructure associated with multiple different cellular radio access networks may be located at or near structures and/or other equipment associated with a particular access point, such as access points 104a and 104b.

In some implementations of system environment 100, the cellular radio access networks serviced by access points 104a, 104b, and any other access points in a given area are identical, in the sense that as user equipment 102 moves from an area serviced by access point 104a to an area serviced by access point 104b, the user equipment 102 is able to access the network 106 via a radio access network provided by the same vendor across access points. Although not shown, the system may also include a controller associated with one or more of the cellular access points, (such as base stations for example), so as to facilitate operation of the access points and management of the user equipment 102 in communication therewith. As shown in FIG. 1, a system may also include one or more wireless local area networks (WLANs), each of which may be serviced by a WLAN access point 108 configured to establish wireless communications with the user equipment. As such, the user equipment may communicate with the network via a WLAN access point as shown in solid lines in FIG. 1, or, alternatively, via a cellular access point as shown in dashed lines. The radio access networks as well as the core networks may consist of additional network elements such as routers, switches, servers, gateways, and/or controllers.

By leveraging UE group classification and coexisting associations between UEs as specified for IIoT systems, the serving AMF is enabled to provide fast and efficient activation-deactivation of connection services for individual UEs and/or UE groups which can be accomplished by an apparatus 200 as depicted in FIG. 2. The apparatus may be embodied by and/or incorporated into one or more AMFs/SMFs such as AMF/SMF 110, UEs, such as user equipment 102, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, (such as a smartphone, a tablet computer, or the like, for example). In some example implementations, it may be particularly advantageous to implement the apparatus 200 in connection with one or more RANs or gNBs, AMFs/SMFs, and/or other network elements and/or functions such as a network function including a serving gateway (S-GW), a user plane function (UPF), or any other network function (NF).

Regardless of the manner in which the apparatus 200 is embodied, the apparatus of an example embodiment is configured to include or otherwise be in communication with a processor 202 and a memory device 204 and optionally a user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

II. Example System Operations

As noted herein, many implementations of certain example embodiments of the invention described, contemplated, and/or otherwise disclosed herein are directed to providing solutions for effective IIoT system operation when there are pre-established user-group classification and coexistence (e.g., associations or interdependences between user groups) within individual IIoT systems. Optionally, the user groups may be 5G LAN groups, although other types of user groups may also be supported. The present disclosure provides a method to enable a flexible and efficient support of activation-deactivation of IIoT systems. As discussed herein, a computer-implemented method is provided with includes network-initiated suspend-resume procedures coupled with enhancements to the paging and initial access procedures for facilitating fast and efficient activation-deactivation of connection services for individual UE or user groups, corresponding to activation-deactivation of the IIoT system to which the UE or user group belongs. As such, some example implementations are presented below to clarify how aspects of such example embodiments may be advantageous in certain situations.

In example implementations that arise in such situations, for network-initiated suspend-resume procedures, the serving AMF/Session Management Function (SMF) is updated with the configured user-group contexts of individual UEs regarding the IIoT system to which the UEs belong. In some embodiments, this is realized, for example, by having the UE indicate the configured user-group contexts to which the UE belongs to the serving AMF/SMF using Non-Access-Stratum (NAS) signalling such that the serving AMF/SMF may be appropriately configured. In other words, O&M or AF may provide the serving AMF/SMF with the group configuration of an individual IIoT system being served by the network. The group configuration and management for the individual IIoT system being served is depicted at 306 of FIG. 3. The group configuration for the IIoT system may be configured to individual UEs that belonging to the IIoT system, in part (external), as pre-configuration and, in part (internal), as once-off network configuration valid until a next update by the serving network.

The group configuration of the individual IIoT system being served by the 5G network may comprise one or more classified user groups. Each user group is given one or more unique IDs within the IIoT system to which the group belongs, similar to the internal and external IDs as used for the current 5G LAN group. In addition to UE IDs on RAN, NAS, and network interfaces, user group IDs of the IIoT system to which the groups belong are introduced on RAN, NAS and the network interfaces and used between involved entities such as UEs, the serving RAN and the AMF/SMF for addressing group-based control signalling. For example, a cell radio network temporary identifier (C-RNTI) of an individual user group on the RAN may be used for scheduling a groupcast control message over an air (Uu) interface to the user group Further, associated configuration related to UE contexts are commonly applicable to all members of a user group. In some embodiments, an IIoT system to which the group(s) belong can be seen as an overall user group and therefore ID(s) of the user group needs to be unique across all the IIoT systems being served by the network. In some embodiments, to support fast, flexible and efficient activation-deactivation of an individual IIoT system, the group configuration of individual IIoT systems may specify associations or interdependences between configured user groups of the IIoT system to which the user group belongs. For instance, an individual UE or the control entity or server of the IIoT system to which a UE belongs may initiate an activation or deactivation of relevant UE contexts for individual UE(s) or user group(s) just by indicating corresponding user group ID(s) in the request sent to the serving network. As such, because of such preconfigured interdependences between user groups, requests for deactivation of one indicated user group may be meant for all other associated user groups.

In another example embodiment, the group configuration of an individual IIoT system may further specify UE state dependent group configuration corresponding to the state of UE members of the user group. Such efficient group-based control of UE state and state transition as well as group-based configuration of UE contexts provide power-saving and quality of service (QoS) related configurations.

In yet another example embodiment, the group configuration of an individual IIoT system may further specify UE differentiation treatment regarding whether an individual UE needs to follow either UE-based control or group-based control or both. In this case, the network supports specific roles of individual UEs of individual user groups (e.g., master or group-leader UEs).

A. Suspend Procedure

The network-initiated suspend procedure corresponds to a deactivation request from the IIoT system, wherein the deactivation request from the IIoT system can be for a short-term deactivation (suspension) or a long-term deactivation. In an example embodiment and as shown in FIG. 3, the serving network 326 which comprises radio access equipment such as a gNB base station and AMF/SMF and other NFs including the application function (AF) supporting the IIoT system receives an external request (or indication) from the IIoT system via, for example, AF for a short-term or long-term deactivation of targeted individual UE(s) and/or user group(s) of the corresponding IIoT system. The request of one embodiment includes the GPSI of the targeted UE and/or group ID as specified in standards documents TS 23.501 and TS 23.502. In an example embodiment, an individual UE may have a unique GPSI(s) known by both the IIoT system to which the UE belongs and the serving network. In this case, one or more UE(s) may provide hosting for one or more application device(s) of the IIoT system to which the UE(s) belong which may be invisible or otherwise unknown to the serving network. Thus, having multiple GPSI(s) for one UE may be used as a way to address different application devices if needed.

At 308, the serving network receives the Deactivation Request comprising the targeted UE(s), group ID(s), and/or group configuration updates. In some embodiments, the request may further include updates necessary for the group configuration relevant to the targeted UE(s) and/or user group(s), as indicated in the external request. For example, the external updates may include the earliest time to expect a next reactivation of the targeted UE(s) and/or user group(s) and/or the maximum time interval required for the next reactivation (in regards to a short-term deactivation or a long-term deactivation). The external updates may include ID(s) of predefined UE(s) (e.g., UE(s) with certain roles) of the corresponding targeted user group which are excluded from the request, meaning that the exceptional UE(s) need to be kept in active state. The external updates may further specify the operational requirements upon reactivation of the targeted UE(s) and/or user group(s).

In 310, the serving network 326, based on the received request and the group configuration of IIoT systems being served, determines all the impacted UE(s) and/or user group(s) that need a context update as well as selects an option for the suspension and the next resumption (e.g., determining UE state transition to be enforced and sending a corresponding suspend request to the impacted UE(s) and/or user group(s), either individually (unicast) or commonly (groupcast)). In some embodiments, the needed context updates may include possible updates of the group configuration, power-saving and paging related configurations during the suspension and/or resource allocation to the impacted UE(s) and/or user group(s) for the next resumption, depending on whether the impacted UE(s) and/or user groups are put into RRC INACTIVE or RRC IDLE for the suspension and/or the selected option the serving network provides for the next resumption. Power-saving related enhancements including paging optimization for IDLE and INACTIVE UE have been addressed for Cellular IoT with, e.g., Mobile Initiated Connection Only (MICO) mode, extend Discontinuous Reception (DRX) for Connection Management (CM) IDLE, RRC INACTIVE, etc. These enhancements, however, are applied for individual UEs. According to this disclosure, further paging enhancements are incorporated due to the user-group contexts and network-initiated group-based controls for a targeted individual IIoT system. Accordingly, an example embodiment provides fast and reliable network access and state transitions from IDLE and/or INACTIVE to CONNECTED for a large number of impacted UEs of the targeted IIoT system simultaneously when the next resumption is taking place, including paging for a resume request and corresponding initial access upon the next resumption as discussed herein. In some embodiments, the Paging Control Channel (PCCH) and Paging-Radio Network Temporary Identifier (P-RNTI) may be omitted for INACTIVE UE. That is, INACTIVE UE on assigned paging may monitor the Downlink Physical Control Channel (DPCCH) directly on Cell-Radio Network Temporary Identifier (C-RNTI) of either the UE or the belonging user group, as configured, for possible RRC Resume Request.

Thus, methods, apparatuses, and computer program products are described that manage a large number of UEs of individual IIoT systems. Due to its distributed nature, individual UEs or UE groups of individual IIoT systems may correspond to different physical entities (geographical areas), functions (monitoring sensors, operating sensors, master devices, slave devices, etc.) or operational tasks (open-loop control, closed-loop control, etc.). In at least one embodiment, individual UEs or UE groups of individual IIoT systems are classified into different user groups, wherein each group is associated with particular services and service requirements. Each user group further includes coexisting associations with other user groups in which individual UEs may belong to simultaneously within an individual IIoT system. In order to efficiently support such IIoT systems, methods, apparatuses, and computer program products are described that identify each user group by a unique identifier within the belonging individual IIoT system as well as associated group configurations related to UE contexts common to all UEs or UE groups of the belonging user group. The group configurations comprise associations or interdependences between configured user groups of the belonging IIoT system. This allows for quick and efficient deactivation of UEs and UE groups of the belonging IIoT system. As described herein with regards to suspension procedures, such user group associations and interdependences between user groups facilitate efficient group-based control of procedures such as UE disconnection and connection.

i. Suspend Procedure with Short-Term Deactivation Request

For a short-term deactivation request received from the IIoT system, the serving network 326 may put the impacted UE(s) (that are currently in RRC_CONNECTED state) and/or user group(s) into RRC INACTIVE state, excluding exceptional UE(s) indicated in the short-term deactivation request. In some embodiments, in order to avoid signaling overload for all UE(s) in the group at the same time, the serving network 326 may wait for the UE to become inactive (having no further data to transmit or receive, as expected) prior to initiating PDU session deactivation and/or RRC connection release to trigger the move from RRC_CONNECTED to RRC_INACTIVE state as depicted in 312 of FIG. 3.

The serving RAN 104a may proactively determine whether a synchronized random access channel (RACH)-less, 2-step RACH or a regular RACH option (as specified in the current 3GPP standards) with/without dedicated resource allocation or collision control configuration (random back-off or RACH persistent probability) is to be used for the impacted UEs and/or user group(s) upon the next resumption and indicate that to the impacted UEs and/or user group(s) in the suspend request. The RACH-less option is applicable in case the serving RAN is provided by small cells, often coupled with dedicated resource allocation for initial access of a UE in the uplink (UL). The RACH-less option also is applicable for a stationary IIoT system wherein uplink timing advance (TA) of individual UE towards the serving cell may be preserved.

In block 314, a suspend request is issued by the AMF/SMF 110, wherein the suspend request comprises the impacted UE ID(s), impacted group ID(s), needed context updates as well as a selected option for the suspension and the next resumption. The suspend request may either be UE specific or user-group specific. In 316, the RAN or gNB 104a determines the impacted UE(s), impacted group ID(s), needed context updates as well as the selected option for the suspension and the next resumption. In block 318, a physical downlink control channel (PDCCH) is allocated by the RAN or gNB 104a which carries a downlink allocation on C-RNTI that informs the impacted UE 102 and/or impacted user group. In block 320, the RAN or gNB 104a sends to the impacted UE 102 a connection suspend command message instructing the UE 102 to suspend a RRC connection with the RAN or gNB 104a. Thereafter, as shown in 322, the UE 102 saves the update contexts and enters either RRE IDLE or RRC INACTIVE as requested. In block 324, the RAN or gNB 104a transmits a Suspend Complete message to the AMF/SMF which in turn, transmits a Deactivation Complete message to the requester network functions (NFs) 304 as depicted in 324.

In some embodiments, the impacted UE(s) and/or user group(s) may be configured to monitor paging for network-initiated resume request according to either a UE specific or user-group specific paging occasion, as indicated in the suspend request. In the case where the suspend request is user-group specific, the resource allocation included in the request for initial access upon resumption may be common to the user group and UE members of the user group may select resources from the allocated resources using preconfigured rules. As a result, short-term deactivation procedures may be advantageously expedited, such as in instances in which impacted user groups are determined.

i. Suspend Procedure with Long-Term Deactivation Request

For a long-term deactivation request received from the IIoT system, the serving network 326 may put the impacted UE(s) and/or user group(s) into either RRC INACTIVE state or RRC IDLE state with enhanced power saving configuration, excluding exceptional UE(s) indicated in the long-term deactivation request. For example, when the UE remains inactive the AMF/SMF 110 will initiate a NAS signalling connection (Next Generation Application Protocol (NGAP) connection+RRC connection) release with the reason code AF deactivation request. In some embodiments, the serving RAN or gNB 104a may proactively determine a RACH related configuration to be used for the impacted UEs and/or user group(s) upon the next resumption and indicate that to the impacted UEs and/or user group(s) in the suspend request, as in the previous short-term deactivation.

In another example embodiment, either the serving RAN or gNB 104a in case the impacted UEs and/or user group(s) are kept in an INACTIVE state or the serving AMF/SMF 110 in case the impacted UEs and/or user group(s) are kept in an IDLE state may configure the impacted UEs and/or user group(s) to go into an enhanced discontinuous reception (DRX) mode (e.g. such as by applying for Mobile Initiated Connection Only (MICO) for example [TS23.501]) until a specified time, such as until the earliest time to expect a next reactivation as indicated in the long-term deactivation request, and thereafter into a regular DRX mode to monitor paging for a network-initiated resume request. In this case, a mode transition from, for example, a MICO based mode to an extended DRX based mode is implemented while the impacted UEs are being suspended, as controlled by the serving network based on the earliest time to expect a next reactivation as indicated in the external request of a long-term deactivation received from the IIoT system via, for example, the AF. Either the serving RAN or gNB 104a in case the impacted UEs and/or user group(s) are kept in an INACTIVE state or the serving AMF/SMF 110 in case the impacted UEs and/or user group(s) are kept in an IDLE state may issue the suspend request to the impacted UEs and/or user group(s), wherein the suspend request can be either UE specific or user-group specific. As a result, enhanced power saving may be achieved, such as in instances in which the serving network may put the impacted UE(s) and/or user group(s) into either RRC INACTIVE or RRC IDLE. When the impacted UE(s) and/or user group(s) are inactive, the serving network may initiate deactivation over a NAS transmission scheme in response to inactivity.

B. Resume Procedure

The network-initiated resume procedure 400 of FIG. 4 may be based on the network-initiated suspend procedure described above, and starts with block 402 where the serving network 326 receives an Activation Request comprising the targeted UE(s), group ID(s), and/or group configuration updates. In another embodiment, the network-initiated resume request may be triggered by a message other than an activation request from the IIoT system, such as upon any message from the IIoT system addressed to one or more of the suspended UE(s) and/or user group(s). In some embodiments, the Activation Request or other request message addressed to the suspended UE(s) or user group(s) may further include updates necessary for the group configuration relevant to the targeted UE(s) and/or user group(s), as indicated in the request. In response to receiving the Activation Request, the serving network 326 determines all the impacted UE(s) and/or user group(s), and needed context updates. A paging request is then initiated for the impacted UEs and/or user group(s). In block 406, the paging request comprises the impacted UE(s) and/or user group(s), and needed context updates on NAS. In response to the paging request, the serving network 326 determines the impacted UE(s) and/or user group(s), and needed context updates on RAN for handling the resumption for the impacted UE(s) and/or user group(s). In some embodiments, the paging for the network-initiated resume request as depicted in 410 may include an indication (one or more bits) as to whether the corresponding preserved UE contexts including resources are valid or not (e.g., further updates are expected or not) upon the resume. This paging indicator allows for skipping RRC Resume Request and RRC Resume operations from the UE in case there is no further update upon the resume. That is, the UE may send RRC Resume Complete without delay in response to the paging as shown in 420 and 422.

In some embodiments and as shown in 412, the UE 102 monitors a paging signal having the paging indicator and performs a RACH initial access (e.g., connection request) using configuration and radio resource allocation provided by the last suspend request. When the paging indicator indicates that configuration and radio resources are not valid and that further updates are expected, The UE 102 transmits an RRC Connection Resume Request as depicted in 414, and in response the UE receives from the RAN or gNB 104a a Connection Resume Request comprising the necessary updates as shown in 416. Thereafter, the UE 102 transmits a RRC Connection Resume Complete message to the RAN or gNB 104a as shown in 418. In 420, the RRC Connection Resume Complete message is transmitted to the AMF/SMF 110 from the RAN or gNB 104a and in 422, the RRC Connection Resume Complete message is transmitted from the AMF/SMF 110 to NFs 304.

Alternatively, if the paging indicator indicates that the UE contexts including radio resources are valid, 414 and 416 are skipped. In this case, the UE transmits an RRC Connection Resume Complete message to the RAN or gNB 104a as shown in 418 which is forwarded to the NFs 304 as shown in 420 and 422.

In another example embodiment, Semi-Persistent Scheduling (SPS) resource allocation may be part of preserved UE contexts for suspend-resume operations. Interactions between the application layer and the access layer at the UE side may be considered so that the access layer comprising the serving network and UE may provide further assistance for activation/deactivation of individual IIoT system on the application level. In this case, the control entity or server of the IIoT system may request the serving network to synchronize the connection on/off on the access level towards individual UE and/or user group(s) to the activation/deactivation of the IIoT system on the application level (on/off of application devices such as, for example, sensor/actuator devices in addition to cellular access UE devices). In some embodiments, the network-initiated suspend-resume procedures may be triggered by the control entity of the IIoT system upon either an application-level activation/deactivation or access-network-level suspend/resume. The request from the IIoT system may indicate whether the request is for an application-level activation/deactivation or suspend/resume, and identifies the ID(s) of UE(s) to be excluded from the request. The serving network may keep the indicated exclusive UE(s) in a CONNECTED state while putting the rest of corresponding user group(s) into INACTIVE or IDLE using either UE-based dedicated or group-based common control signalling procedure (or both). The suspend-resume procedure of the serving network also indicates which UE contexts should be applied, whether the current UE contexts applied for the current operation or the preconfigured UE contexts applied for e.g. start-up operation of the IIoT system. The above disclosed embodiments may introduce solutions for optimizing group procedures such as connection establishment by providing a paging mechanism which may avoid unnecessary procedures related to a RRC Connection Resume Request.

III. Example Process Flow

FIG. 5 illustrates a flowchart of the operations of an example method 500 performed by an example apparatus 200 which, in one embodiment, may be embodied by a computer program product comprising computer program code executed by processor 202 of network entity, such as an AMF/SMF 110. As shown in block 502, apparatus 200 of this example embodiment includes means, such as the processor 202, the memory 204, the communication interface 206 or the like, for receiving a deactivation request comprising one or more identifiers for one or more user equipment or one or more user equipment groups. In this regard, prior to the operations depicted in FIG. 5, the UE 102 (IIoT device) has registered with the network supporting the IIoT system, such as the AMF/SMF 110. In some embodiments, the one or more identifiers for one or more user equipment or one or more user equipment groups comprises a GPSI or a user group ID which may have been provided to the AMF in subscription data. In this case, if the user group ID is known, the AMF/SMF 110 may use the group ID to carry out suspension and/or resumption procedures with the group of UEs (IIoT devices).

In some embodiments, the deactivation request further comprises one or more configuration updates, wherein the one or more configuration updates comprises an expected reactivation time or a maximum required time interval before reactivation of the one or more user equipment or user equipment groups that are impacted. As shown in block 504, apparatus 200 of this example embodiment includes means, such as the processor 202, the memory 204, the communication interface 206 or the like, for determining which one or more user equipment or user equipment groups are impacted by the deactivation request. In addition to determining the one or more user equipment or user equipment groups are impacted by the deactivation request, the apparatus 200 of this example embodiment includes means, such as the processor 202, the memory 204, the communication interface 206 or the like, for determining needed context update as well as selected options for the suspension (and the next resumption) of the one or more user equipment or user equipment groups impacted by the deactivation request. In other words, the apparatus 200 of this example embodiment includes means, such as the processor 202, the memory 204, the communication interface 206 or the like, for determining what UE state transition to be enforced and causing a corresponding suspend request to be transmitted to the impacted UE(s) and/or user group(s), either individually (unicast) or commonly (groupcast). In this regard, and as shown in block 506, the apparatus 200 of this example embodiment includes means, such as the processor 202, the memory 204, the communication interface 206 or the like, for causing a suspend request to be transmitted to the one or more user equipment or user equipment groups that are impacted.

In some embodiments, the apparatus 200 of this example embodiment includes means, such as the processor 202, the memory 204, the communication interface 206 or the like, for waiting for the one or more user equipment or user equipment groups that are impacted to become inactive prior to causing a radio resource control (RRC) connection release triggering updating an operational state of the one or more user equipment or user equipment groups that are impacted to an RRC inactive state or an RRC idle state. This is done to avoid at least signalling overload for all UE(s) in the group at the same time. The RRC connection release is a connection release for one or more IIoT device.

FIG. 6 illustrates a flowchart of the operations of an example method 600 performed by an example apparatus 200 which, in one embodiment, may be embodied by a computer program product comprising computer program code executed by processor 202 of network entity, such as an AMF/SMF 110. As shown in block 602, apparatus 200 of this example embodiment includes means, such as the processor 202, the memory 204, the communication interface 206 or the like, for receiving an activation request comprising one or more identifiers for one or more user equipment or one or more user equipment groups. In some embodiments, the one or more identifiers for one or more user equipment or one or more user equipment groups comprises a GPSI or a user group ID which may have been provided to the AMF in subscription data. In block 604, the apparatus 200 of this example embodiment includes means, such as the processor 202, the memory 204, the communication interface 206 or the like, for determining which one or more user equipment or user equipment groups are impacted by the activation request.

In block 606, the apparatus 200 of this example embodiment includes means, such as the processor 202, the memory 204, the communication interface 206 or the like, for causing a notice to be transmitted to the one or more user equipment or user equipment groups that are impacted. In an example embodiment, the notice is a paging request and is sent within an already established UE or group associated signaling connection. This notice (paging message) indicates, via one or more bits, whether preserved UE contexts including configuration and radio resources associated with the one or more user equipment or user equipment groups that are impacted are valid or not (e.g., further updates to configuration and radio resources are expected or not) upon resume. In this way, the notice may allow for skipping RRC Resume Request and RRC Resume procedures from the UE 102 the instance when the indicator indicates there is no further updates upon the resume. That is, the UE 102 may send a RRC Resume Complete message immediately in response to the notice. The RRC Resume Complete message indicates successful RRC connection for one or more Industrial Internet of Things (IIoT) device. In this regard, the apparatus 200 of this example embodiment includes means, such as the processor 202, the memory 204, the communication interface 206 or the like, for receiving a respective RRC connection resume complete message from the one or more user equipment or user equipment groups that are impacted in an instance in which the notice comprises an indication that the configuration and radio resources associated with the one or more user equipment or user equipment groups that are impacted are valid. Alternatively, the apparatus 200 of this example embodiment includes means, such as the processor 202, the memory 204, the communication interface 206 or the like, for causing a configuration update procedure in an instance in which the notice comprises an indication that the configuration and radio resources associated with the one or more user equipment or user equipment groups that are impacted are not valid. In this case, RRC resume procedures of resuming the RRC connection using context updates is required.

FIGS. 5 and 6 illustrate flowcharts of an apparatus 200, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (such as hardware, for example) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Many of the drawings refer to a radio access network or RAN for the purposes of clarity and to provide the particulars of one or more example implementations that may be possible within the scope of present disclosure. It should be appreciated, however, that such examples are not intended to limit the scope of the invention to only implementations that may involve a RAN, as the invention applies to and may be implemented in accordance with any kind of access network and/or combination of access networks.

What is claimed is:

1. A method comprising:
   receiving a deactivation request comprising one or more identifiers for one or more user equipment or one or more user equipment groups, the one or more identifiers for one or more user equipment or one or more user equipment groups comprising a generic public subscription identifier (GPSI) or a user group identification (ID) received in subscription data;
   determining which one or more user equipment or user equipment groups are impacted by the deactivation request; and
   causing a suspend request to be transmitted to the one or more user equipment or user equipment groups that are impacted,
   wherein the deactivation request further comprises one or more configuration updates, wherein the one or more configuration updates comprises an expected reactivation time or a maximum required time interval before reactivation of the one or more user equipment or user equipment groups that are impacted
   the method further comprising:
   waiting for the one or more user equipment or user equipment groups that are impacted to become inactive prior to causing a radio resource control (RRC) connection release triggering updating an operational state of the one or more user equipment or user equipment groups that are impacted to an RRC inactive state or an RRC idle state, wherein the RRC connection release is a connection release for one or more Industrial Internet of Things (IIoT) device;
   determining needed context updates as well as selected options for the suspension (and the next resumption) of the one or more user equipment or user equipment groups impacted by the deactivation request; and
   determining what user equipment state transition is to be enforced and causing a corresponding suspend request to be transmitted to the impacted user equipment and user groups, either individually via unicast or commonly via groupcast.

2. The method of claim 1, wherein the needed context updates include updates of the group configuration, power-saving and paging related configurations during the suspension and resource allocation to the impacted user equipment and user groups for the next resumption, based on whether the impacted user equipment and user groups are put into RRC INACTIVE or RRC IDLE for the suspension and the selected option the serving network provides for the next resumption.

3. The method of claim 2, wherein the power-saving related enhancements include paging optimization for IDLE and INACTIVE UE have been addressed for Cellular IoT with Mobile Initiated Connection Only (MICO) mode and extend Discontinuous Reception (DRX) for Connection Management (CM) IDLE, RRC INACTIVE, wherein the enhancements are applied for individual user equipment.

4. The method of claim 3, wherein further paging enhancements are incorporated due to the user-group contexts and network-initiated group-based controls for a targeted individual IIoT system, wherein a Paging Control Channel (PCCH) and a Paging-Radio Network Temporary Identifier (P-RNTI) are omitted for INACTIVE user equipment, wherein INACTIVE user equipment on assigned paging monitor the Downlink Physical Control Channel (DPCCH) directly on Cell-Radio Network Temporary Identifier (C-RNTI) of either the user equipment or the belonging user group, as configured, for possible RRC Resume Request.

5. The method of claim 4, wherein Semi-Persistent Scheduling (SPS) resource allocation is part of preserved user equipment (UE) contexts for suspend-resume operations, wherein the method further comprises receiving a request from the IIoT system indicating whether the request is for an application-level activation/deactivation or suspend/resume, and identifies the ID(s) of user equipment to be excluded from the request and keeping indicated exclusive user equipment in a CONNECTED state while putting the rest of corresponding user groups into INACTIVE or IDLE using either user equipment-based dedicated or group-based common control signalling procedure, wherein the suspend-resume procedure also indicates which UE contexts should be applied and whether the current UE contexts applied for the current operation or the preconfigured UE contexts applied for a start-up operation of the IIoT system.

6. An apparatus comprising at least one processor and at least one memory including computer program code for one or more programs, the at least one memory and the computer program code configured to, with the at least one processor, cause the apparatus at least to:
  receive a deactivation request comprising one or more identifiers for one or more user equipment or one or more user equipment groups, wherein the one or more identifiers comprises a generic public subscription identifier (GPSI) of a user equipment or a user group identification (ID);
  determine which one or more user equipment or user equipment groups are impacted by the deactivation request; and
  cause a suspend request to be transmitted to the one or more user equipment or user equipment groups that are impacted,
  wherein the deactivation request further comprises one or more configuration updates, wherein the one or more configuration updates comprises an expected reactivation time or a maximum required time interval before reactivation of the one or more user equipment or user equipment groups that are impacted,
  wherein the computer program code is further configured to, with the at least one processor, cause the apparatus to wait for the one or more user equipment or user equipment groups that are impacted to become inactive prior to causing a radio resource control (RRC) connection release triggering updating an operational state of the one or more user equipment or user equipment groups that are impacted to an RRC inactive state or an RRC idle state, wherein the RRC connection release is a connection release for one or more Industrial Internet of Things (IIoT) device,
  wherein the computer program code is further configured to, with the at least one processor, cause the apparatus to:
  wait for the one or more user equipment or user equipment groups that are impacted to become inactive prior to causing a radio resource control (RRC) connection release triggering updating an operational state of the one or more user equipment or user equipment groups that are impacted to an RRC inactive state or an RRC idle state, wherein the RRC connection release is a connection release for one or more Industrial Internet of Things (IIoT) device;
  determine needed context updates as well as selected options for the suspension (and the next resumption) of the one or more user equipment or user equipment groups impacted by the deactivation request;
  determine what user equipment state transition is to be enforced and causing a corresponding suspend request to be transmitted to the impacted user equipment and user groups, either individually via unicast or commonly via groupcast.

7. The apparatus of claim 6, wherein the needed context updates include updates of the group configuration, power-saving and paging related configurations during the suspension and resource allocation to the impacted user equipment and user groups for the next resumption, based on whether the impacted user equipment and user groups are put into RRC INACTIVE or RRC IDLE for the suspension and the selected option the serving network provides for the next resumption.

8. The apparatus of claim 7, wherein power-saving related enhancements include paging optimization for IDLE and INACTIVE UE have been addressed for Cellular IoT with Mobile Initiated Connection Only (MICO) mode and extend Discontinuous Reception (DRX) for Connection Management (CM) IDLE, RRC INACTIVE, wherein the enhancements are applied for individual user equipment.

9. The apparatus of claim 8, wherein further paging enhancements are incorporated due to the user-group contexts and network-initiated group-based controls for a targeted individual IT system, wherein a Paging Control Channel (PCCH) and a Paging-Radio Network Temporary Identifier (P-RNTI) are omitted for INACTIVE user equipment, wherein INACTIVE user equipment on assigned paging monitor the Downlink Physical Control Channel (DPCCH) directly on Cell-Radio Network Temporary Identifier (C-RNTI) of either the user equipment or the belonging user group, as configured, for possible RRC Resume Request.

10. The apparatus of claim 9, wherein Semi-Persistent Scheduling (SPS) resource allocation is part of preserved user equipment (UE) contexts for suspend-resume operations, wherein the method further comprises receiving a request from the IIoT system indicating whether the request is for an application-level activation/deactivation or suspend/resume, and identifies the ID(s) of user equipment to be excluded from the request and keeping indicated exclusive user equipment in a CONNECTED state while putting the rest of corresponding user groups into INACTIVE or IDLE using either user equipment-based dedicated or group-based common control signalling procedure, wherein the suspend-resume procedure also indicates which UE contexts should be applied and whether the current UE contexts applied for the current operation or the preconfigured UE contexts applied for a start-up operation of the IIoT system.

11. An apparatus comprising at least one processor and at least one memory including computer program code for one or more programs, the at least one memory and the computer program code configured to, with the at least one processor, cause the apparatus at least to:
  receive an activation request comprising one or more identifiers for one or more user equipment or one or more user equipment groups, the one or more identifiers for one or more user equipment or one or more user equipment groups comprising a generic public subscription identifier (GPSI) or a user group identification (ID) received in subscription data;
  determine which one or more user equipment or user equipment groups are impacted by the activation request; and
  cause a notice to be transmitted to the one or more user equipment or user equipment groups that are impacted, wherein the notice comprises an indication whether a configuration and radio resources associated with the one or more user equipment or user equipment groups that are impacted are valid,
  wherein the computer program code is further configured to, with the at least one processor, cause the apparatus to:

receive a respective radio resource control (RRC) connection resume complete message from the one or more user equipment or user equipment groups that are impacted in an instance in which the notice comprises an indication that the configuration and radio resources associated with the one or more user equipment or user equipment groups that are impacted are valid; and cause a configuration update procedure in an instance in which the notice comprises an indication that the configuration and radio resources associated with the one or more user equipment or user equipment groups that are impacted are not valid, wherein the RRC connection resume complete message indicates successful RRC connection for one or more Industrial Internet of Things (IIoT) device, wherein the notice comprises a paging message indicating, via one or more bits, whether preserved user equipment contexts including configuration and radio resources associated with the one or more user equipment or user equipment groups that are impacted are valid or not upon resume.

\* \* \* \* \*